May 22, 1945.  O. J. KENYON  2,376,780
TAIL STRUCTURE FOR AIRCRAFT
Filed Jan. 26, 1942  2 Sheets-Sheet 1
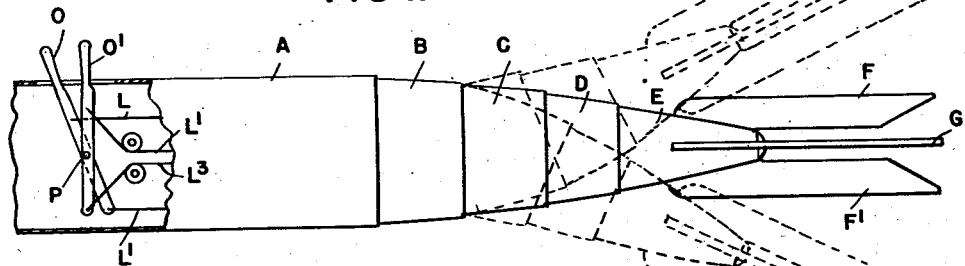
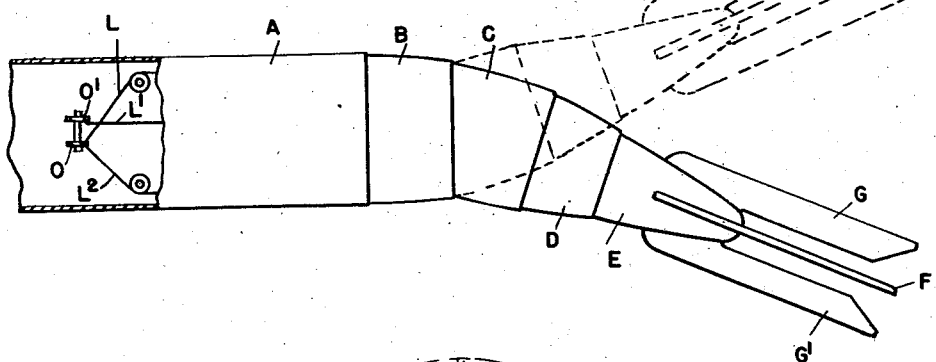
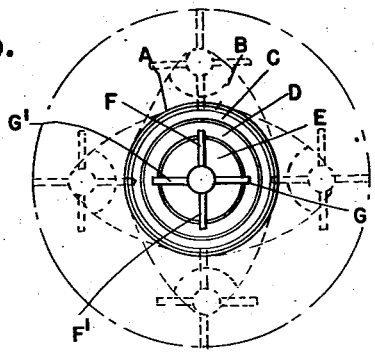
INVENTOR.
OADES J. KENYON
ATTORNEYS May 22, 1945.   O. J. KENYON   2,376,780
TAIL STRUCTURE FOR AIRCRAFT
Filed Jan. 26, 1942   2 Sheets-Sheet 2
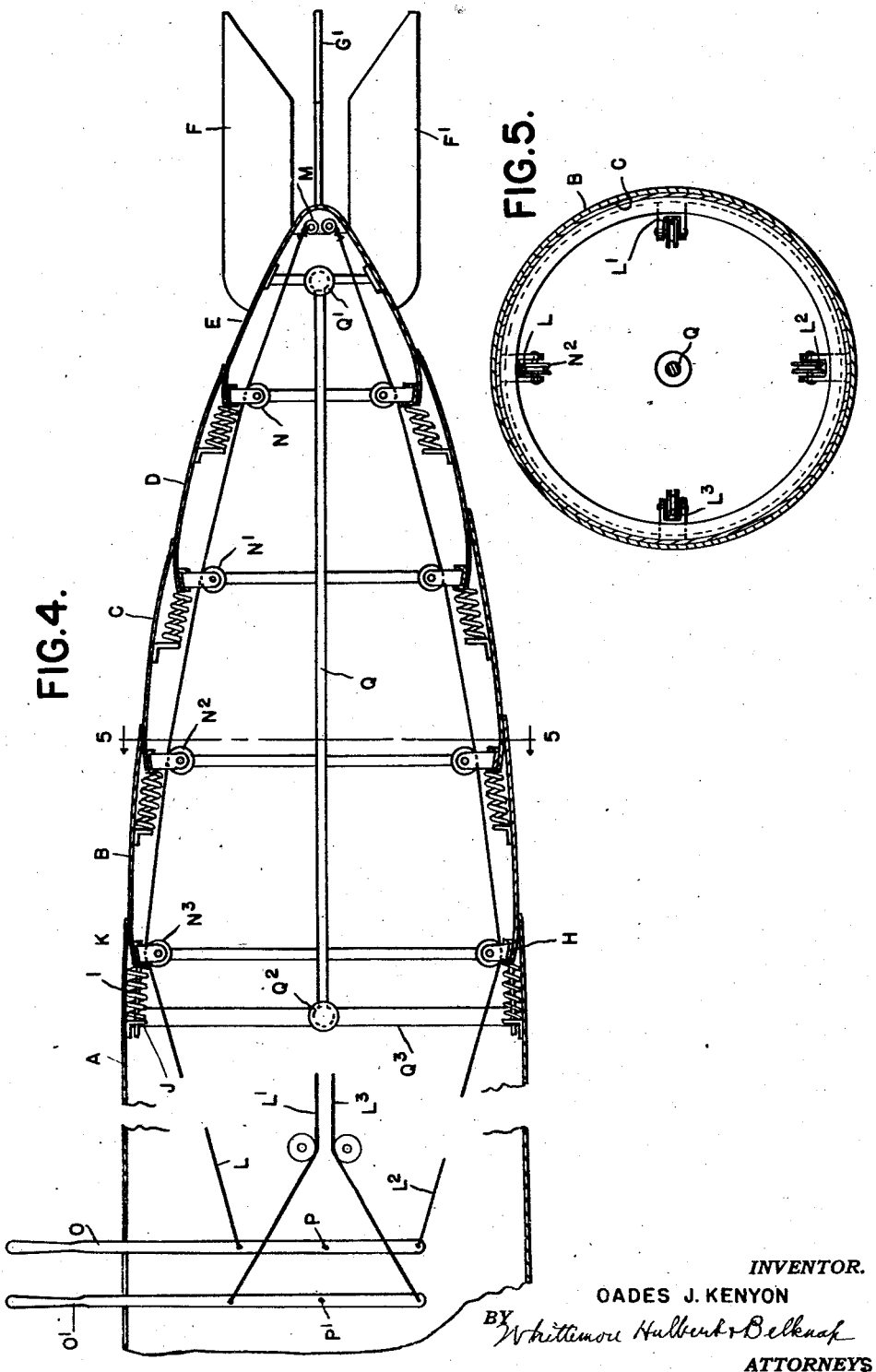
INVENTOR.
OADES J. KENYON
BY Whittemore Hulbert & Belknap
ATTORNEYS Patented May 22, 1945

2,376,780

UNITED STATES PATENT OFFICE 2,376,780

TAIL STRUCTURE FOR AIRCRAFT

Oades J. Kenyon, Santa Barbara, Calif.

Application January 26, 1942, Serial No. 428,283

1 Claim. (Cl. 244—87)

The invention relates to tail structures for aircraft and more particularly for use on airplanes.

It is the primary object of the invention to lessen the drag or resistance to forward movement of the machine, and to this end the invention consists in the construction as hereinafter set forth.

In the present state of the art, airplane tail structures are usually formed by a rigid frame on the rear end of which the elevators and rudder are mounted. When these members are adjusted angularly to change the direction of movement of the plane they place a great impediment to forward movement, amounting sometimes to as much as thirty percent. To avoid this loss, I have devised a flexible tapering streamlined tail structure having elevator and rudder blades symmetrically arranged at the rear end thereof so as to produce negligible resistance when the plane is traveling in a straight line.

I have also provided means for warping or curving this tail structure with respect to its normal longitudinal axis in any plane thereof. This will effect a turning in much the same manner as the tail of a fish, and with a minimum drag or resistance to forward movement.

I preferably form this streamlined structure of a series of sections universally jointed to each other so as to permit warping of the whole in any axial plane. There is further provided means for effecting said warping so that without loss of streamlined contour, the elevator and rudder blades may be moved on one side or the other of the normal axis and angularly adjusted with respect thereto. Thus, a plane provided with this improved tail construction will have greater speed and maneuverability than with the standard construction.

As specifically illustrated:

Fig. 1 is a side elevation of my improved tail structure;

Fig. 2 is a plan view thereof;

Fig. 3 is a rear elevation;

Fig. 4 is a longitudinal section; and

Fig. 5 is a cross section on line 5—5 of Fig. 4.

As shown in Fig. 4, A is a section rigidly attached to the body of the aircraft, and B, C, D and E are successive tapering streamlined sections. The rearmost section E has rudder blades F, F' attached thereto and extending rearward therefrom in a vertical plane. It is also provided with elevator blades G, G' similarly arranged in a horizontal plane. Each of these sections is connected to adjacent sections by an annular universal joint H, which includes a substantially arcuate portion at the forward end of the section which underlaps the rear end of the next forward section. The arrangement is such that each section may be moved angularly in any direction with respect to the normal longitudinal axis of the tail, so that by suitable actuating means, the whole series may be warped in this direction.

To hold the sections normally with their axes in rectilinear alignment, I preferably provide a series of springs or other resilient means I, distributed about the axis, the opposite ends of each spring abutting against shoulders J and K, respectively, on the adjacent sections. These springs are all under a predetermined tension so as to balance each other. When, however, one section is moved angularly with respect to another, the springs on one side will be further compressed, and those on the opposite side expanded to permit this movement.

For relatively moving the sections, I preferably provide a plurality of cables which, as shown, are four in number, L, L', $L^2$ and $L^3$, arranged at equal intervals about said sections. These cables at their rear end are connected to suitable anchors M on the rear section E, from which they extend substantially parallel to the streamlined contour, being guided by sheaves N, N', $N^2$ and $N^3$ on the successive sections. The forward ends of the cables are connected to a control device which, as shown, is formed by two levers O and O' located in operative relation to the pilot. The opposite cables L, $L^2$ are connected to the lever O on opposite sides of the fulcrum P thereof, and in like manner the opposite cables L', $L^3$ are connected to the lever O' on opposite sides of its fulcrum P'. Thus, by manipulating these levers, a steering of the streamlined structure may be effected in any axial plane, to an extent dependent upon the amplitude of movement of the levers.

There is also preferably provided an axially extending connecting bar or strut Q, which at one end is connected by universal joint Q' to the rearmost section E, and at its opposite end is connected by a universal joint $Q^2$ with a frame $Q^3$ in the stationary section A. This precludes any possibility of the sections pulling apart, even in case one or more of the cables L, L' were broken.

From the description as above given, the operation of the structure will be understood, but briefly is as follows:

Assuming that the plane is traveling in a straight line and the pilot desires to change the direction upward or downward, the lever O is manipulated to warp the streamlined structure in a vertical plane. This, by changing the angle of the elevator blades G, will produce the desired effect.

On the other hand, if the pilot desires to turn to either right or left, the lever O' is manipulated to warp the tail structure in a horizontal plane, and the angular movement of the rudder blades G and G' will then effect the turning.

It is also possible to simultaneously adjust both of the levers O and O' to effect the warping in oblique planes, and therefore it is possible to warp the structure in any direction with respect to its normal axis.

By reason of the fact that the streamlined structure is warped by a force applied to the rearmost section and also because of the resilient means between said sections, the structure is permitted to adjust itself to a true streamlined form. In other words, if there is greater air pressure on one section than on the others, this section will yield, thereby restoring the streamlined formation.

What I claim as my invention is:

In aircraft, a tapering streamlined tail structure formed of a series of ridged sections, universal joints between said sections permitting a limited relative angular movement of the longitudinal axes thereof while maintaining an unbroken streamlined surface in all positions of relative adjustment, a rod extending between and universally pivoted to the end sections of the series to maintain the same a fixed longitudinal distance apart, resilient means between adjacent sections for normally holding the same with the axis thereof in rectilinear alignment, elevator and rudder blades connected to the rearmost section respectively in horizontal and vertical planes and upon opposite sides of the longitudinal axis, and means connected to the rearmost section for holding the same and the intermediate sections in any axial plane to warp said streamlined structure in said plane.

OADES J. KENYON.